(12) United States Patent
Fishman et al.

(10) Patent No.: US 6,595,165 B2
(45) Date of Patent: Jul. 22, 2003

(54) ELECTRONICALLY CONTROLLED THERMOSTAT

(76) Inventors: Joseph Fishman, 120A Silver Star Blvd., Scarborough, Ontario (CA), M1V 4V8; Eli Elkayam, 29, Josef Levi Street, Kiryat, Bialik (IL)

( * ) Notice: Subject to any disclaimer, the term of this patent is extended or adjusted under 35 U.S.C. 154(b) by 0 days.

(21) Appl. No.: 10/050,645

(22) Filed: Jan. 16, 2002

(65) Prior Publication Data

US 2002/0096130 A1 Jul. 25, 2002

Related U.S. Application Data

(63) Continuation-in-part of application No. 09/962,781, filed on Sep. 25, 2001.

(51) Int. Cl.⁷ ................................................. F01P 7/14
(52) U.S. Cl. ..................................................... 123/41.1
(58) Field of Search ........................... 123/41.1, 41.44, 123/41.29, 41.08, 41.09; 236/34.5, 68 R

(56) References Cited

U.S. PATENT DOCUMENTS

| | | | |
|---|---|---|---|
| 3,313,483 A | * 4/1967 | Nallinger | 236/34.5 |
| 3,907,199 A | 9/1975 | Kreger | 237/12.3 B |
| 4,550,693 A | 11/1985 | Saur | 123/41.1 |
| 4,666,081 A | * 5/1987 | Cook et al. | 236/68 R |
| 4,674,679 A | 6/1987 | Saur | 236/34.5 |
| 4,875,437 A | 10/1989 | Cook et al. | 123/41.1 |
| 4,890,790 A | 1/1990 | Wagner | 236/34.5 |
| 4,961,530 A | 10/1990 | Wagner | 236/34.5 |
| 5,385,296 A | 1/1995 | Kurz et al. | 236/34.5 |
| 5,447,271 A | 9/1995 | Kunze et al. | 236/34.5 |
| 5,482,010 A | 1/1996 | Lemberger et al. | 123/41.1 |
| 5,494,005 A | 2/1996 | Saur | 123/41.1 |
| 5,529,025 A | 6/1996 | Ranzinger et al. | 123/41.1 |
| 5,555,854 A | 9/1996 | Huemer et al. | 123/41.1 |
| 5,582,138 A | 12/1996 | Ziolek et al. | 123/41.1 |
| 5,603,485 A | 2/1997 | Schwarz | 251/332 |
| 5,775,270 A | 7/1998 | Huemer et al. | 123/41.1 |
| 5,799,625 A | 9/1998 | Ziolek et al. | 123/41.1 |
| 5,971,288 A | * 10/1999 | Davis et al. | 236/68 R |

* cited by examiner

*Primary Examiner*—Henry C. Yuen
*Assistant Examiner*—Hyder Ali
(74) *Attorney, Agent, or Firm*—Fay, Sharpe, Fagan, Minnich & McKee, LLP

(57) ABSTRACT

An apparatus for controlling a temperature of an engine by controlling the flow of a liquid engine coolant to a radiator is disclosed. The apparatus includes a thermostat having a thermally responsive valve for substantially blocking or opening the flow of coolant to the radiator to maintain the engine at or about a preferred engine operating temperature. Also included is a thermally activated actuator for opening the valve in response to an engine condition such as load or a need for power. The actuator is activated at a temperature different than the thermostat. A source of electro thermal energy is provided to motivate the actuator so the valve may be opened on demand. In one aspect the invention provides a method of controlling the temperature of the engine by opening the valve in response to engine monitoring.

19 Claims, 4 Drawing Sheets

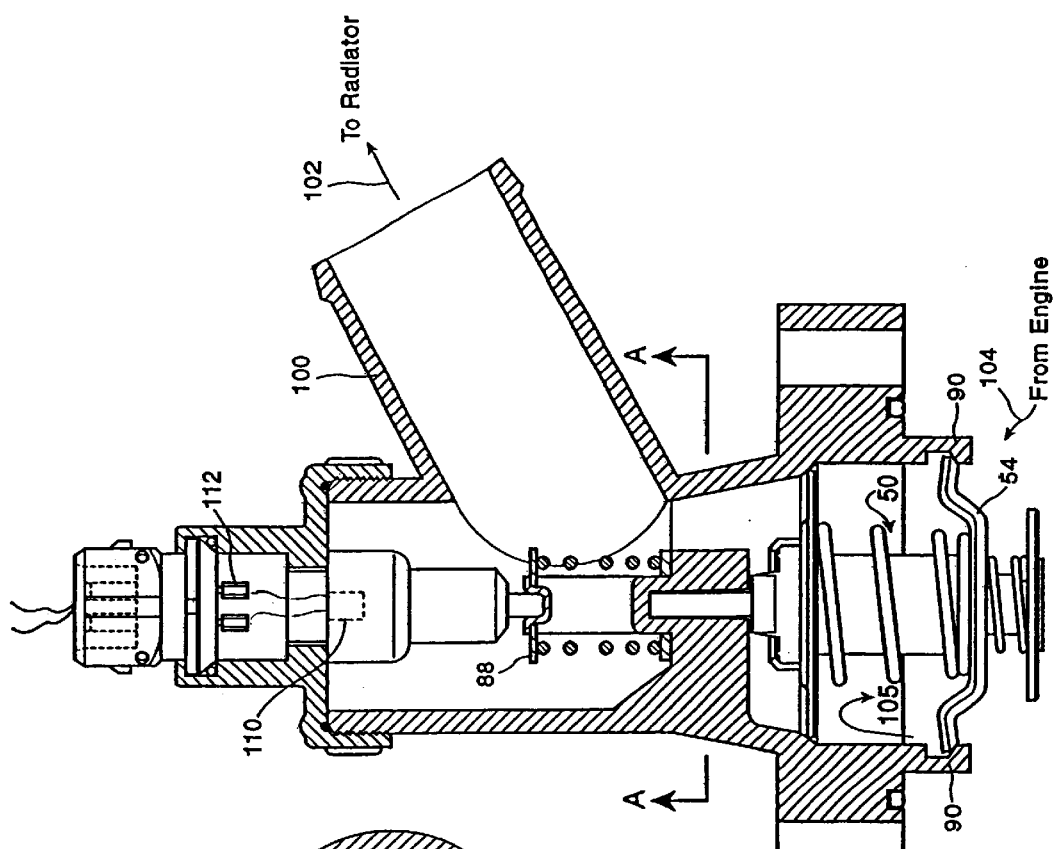
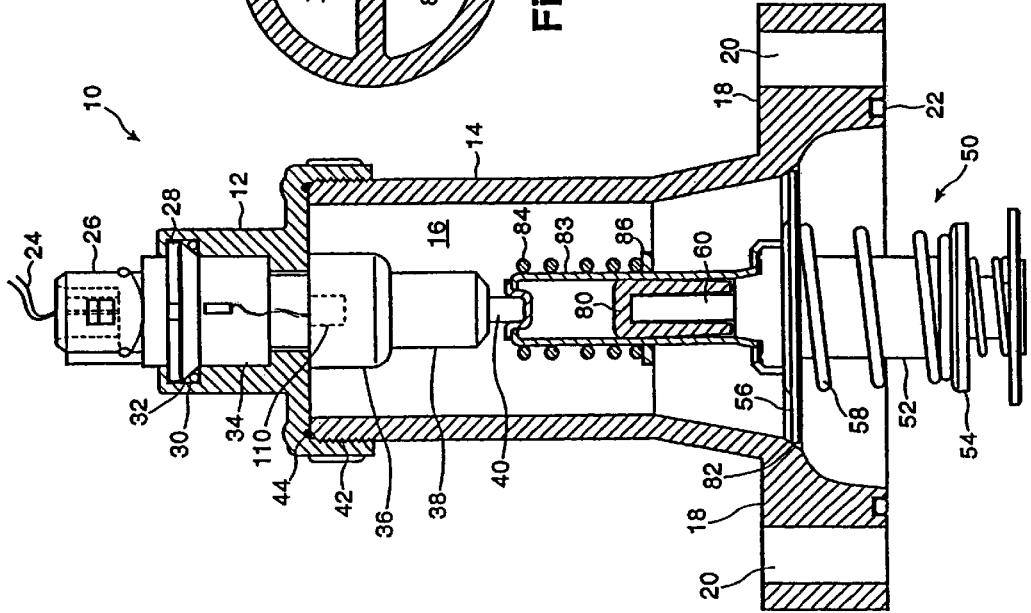

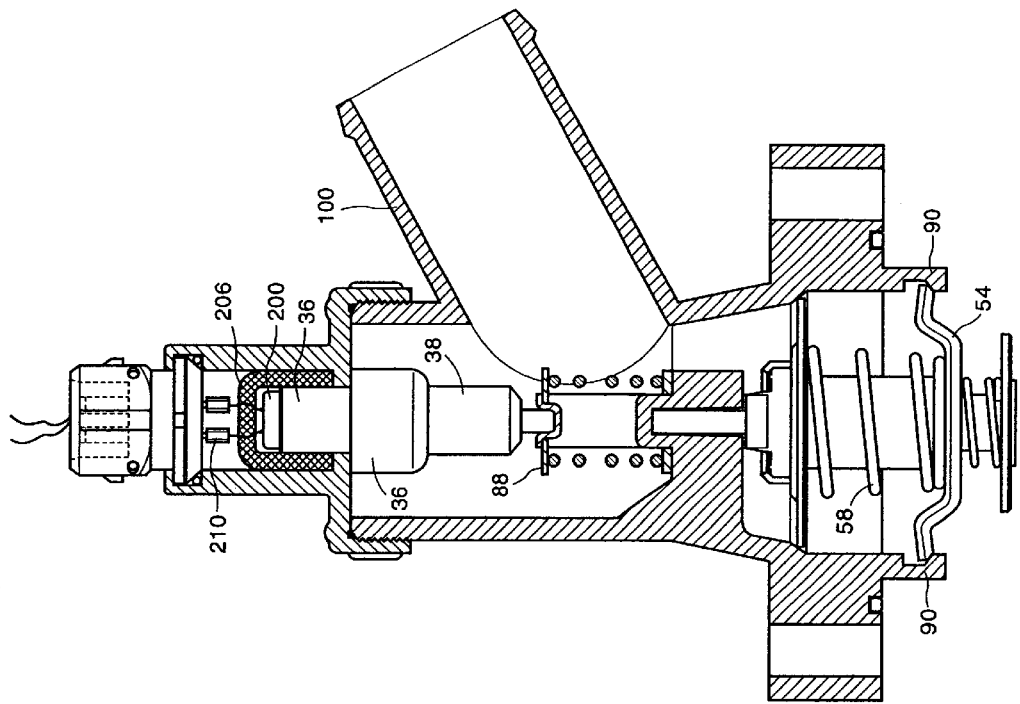
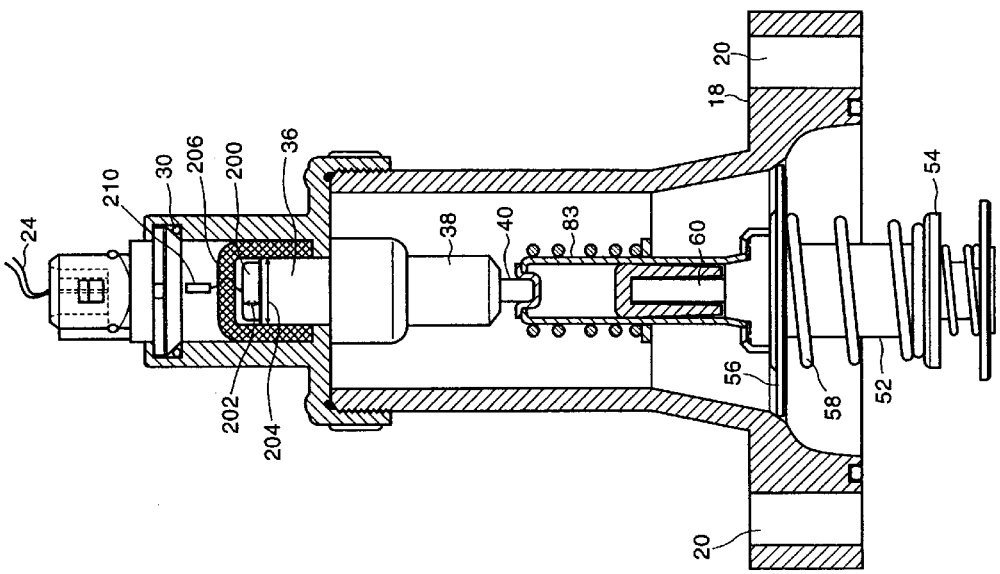

ELECTRONICALLY CONTROLLED THERMOSTAT

FIELD OF THE INVENTION

This invention relates generally to the field of internal combustion engines and more particularly to the cooling systems used to control the heat generated by such combustion engines. Most particularly, this invention relates to thermostats used to control the flow of the coolant between an engine and a heat exchanger such as a radiator.

BACKGROUND OF THE INVENTION

Thermostats have been known and used extensively to control the circulation of coolant in internal combustion engines. In the past, the thermostats have taken the form of valves which are immersed in the coolant in, for example, a coolant conduit. Most commonly the valves include a valve member which spans the conduit and sits against a valve seat. Thus, in the closed position the valve substantially blocks the flow of coolant, for example, to the radiator, allowing the coolant to re-circulate past the engine and to heat up more quickly.

Typically such valves include a closed body containing a thermally expandable material such as wax. A piston is provided which is thrust outward upon the expansion of the wax due to higher coolant temperatures. The piston lifts the valve off the valve seat to allow the coolant to circulate past a heat exchanger, such as a radiator. This lowers the temperature of the coolant and removes heat from the engine. A spring is provided to urge the valve to a closed position so that in the resting or cooled state the valve is closed. Thus, when an engine is first started, the valve will be closed allowing the engine to attain its optimum running temperature more quickly.

Thermostats, to date, have been designed to permit the engine to operate over time at a constant optimum temperature. The thermostat accomplishes this by opening a valve in the cooling system when the engine temperature, and thus the liquid coolant temperature, rises. Opening the valve permits more flow to a heat exchanger such as a radiator, permitting more heat to be dissipated, which in turn can lower the engine temperature. As the engine temperature drops, and thus the coolant temperature drops, the valve closes, reducing the amount of heat dissipated and again maintaining an optimum operating temperature.

Such prior art thermostats are effective, simple and reliable, but suffer from several drawbacks. One is that the thermostat essentially requires the engine designer to set one optimum engine temperature. However, in practice, the engine operating temperature is known to affect engine performance. Specifically, a hotter running engine produces less in the way of emissions, by permitting more complete combustion which in turn improves fuel economy. A hotter running engine will deliver less power, while a cooler running engine delivers more power. Thus, any single optimum engine temperature is a compromise between power and emissions.

Another drawback is that thermostats are slow to respond. The coolant temperature change is fairly gradual and since the change in coolant temperature controls movement of the piston, the valve only opens slowly. Essentially the response of the thermostat lags the engine demand and thus acts as a dampened system. For example, it might take the thermostat 12 minutes to respond in winter when the engine start is very cold, and about 5 minutes in summer where the engine start temperature is warmer. Sharp changes in engine temperature which arise and then recede quickly are not well managed by the thermostat. However, such sharp changes may occur, for example during acceleration from a stop, when accelerating to pass, or when climbing a hill. Therefore there has been an effort to develop a thermostat which responds, on demand, rather than simply following coolant temperature. Of course, the thermostat still needs to reliably respond to coolant temperature changes in a manner which prevents overheating.

Various levers and actuators have been proposed to open and close valve elements on demand, but these suffer from various disadvantages. Firstly, they are relatively expensive. Secondly, they involve complex moving parts, which can fail over time. A failed system could lead to overheating and failure of the engine, which is unacceptable. Thus, electro-mechanical systems are inappropriate for the under the hood environment.

U.S. Pat. No. 4,890,790 and its related U.S. Pat. No. 4,961,530 disclose a better thermo-mechanical solution with a thermostat which is more responsive than one limited to responding to coolant temperature only. This patent teaches a first thermostat 40 located in the usual position within a coolant conduit and then a second thermostat like device 52 (called a thermal motor) located outside of the conduit and being insulated therefrom. The device 52 includes the same element as a thermostat as previously described, namely a closed body, a thermally expandable material within the body and a piston which can be extended in response to a temperature rise in the thermally expandable material. However, rather than the coolant temperature governing the degree of extension, the device 52 includes a small electrical heater within the closed body which can be used to heat the expandable material to in turn cause a piston to extend. The pistons of device 52 and the regular thermostat are made coaxial so that when the electrically controlled piston extends, the valve of the thermostat is lifted off the valve seat. The patents teach that in this way the valve can be opened in response to engine parameters such as load or the like measured by other sensors and the coolant allowed to circulate before the heat builds up in the engine. This ability to control the opening of the valve is said to virtually eliminate customer complaints of engine overheating and improves fuel economy and reduces emissions.

While a reasonable solution in some respects, this prior art device still suffers from numerous drawbacks and has not found widespread acceptance. For example, the thermal motor 52, although insulated from the coolant, projects, somewhat exposed, into the under the hood compartment. The air temperature of the under the hood environment can vary widely, depending upon outside temperature, and further can be quite hot when the engine reaches steady state operating temperatures, up to about 25% higher than the coolant temperature. Such a wide temperature range for the operating conditions of the thermally activated motor make it difficult to predict how much heat is needed from the electrical heater to cause the motor to move. Worse, the device 52 might be activated by the ambient temperature without even being controlled by the engine control system, which is unacceptable.

Further, connecting the piston of the device 52 to the thermostat piston coaxially magnifies the effect of the two thermally activated pistons systems since their movements are cumulative. This makes the valve opening and closing overly sensitive and difficult to reliably control. What is believed to happen in practice is that the valve will tend to open too much and then close too much and to essentially oscillate about the desired set point in an undampened manner. Such oscillation is hard on the components and renders the desired temperature less of the time, making the device less efficient rather than more efficient. What is needed therefore is a simple and reliable way of providing accurate temperature control for an internal combustion engine which responds both to the coolant temperature, which is responsive to engine load and which avoids these problems.

SUMMARY OF THE INVENTION

What is needed therefore is a controllable thermostat system which on the one hand is readily controlled by an engine control system to permit rapid response to short duration peak loads and yet which still responds in a safe and reliable way to changes in coolant temperature to prevent overheating. In this way, in the event the device ever fails, the thermostat portion will still be active to prevent engine overheating. Further the system should be made from inexpensive components which are reliable, safe and simple to install. The system should respond appropriately and not for example be susceptible to changes in operating environment causing the device to undesirably initiate, nor should the device be too sensitive and tend to overshoot in an undampened way any desired set point temperature. Further, the device should permit the engine temperature to be lowered on demand, to deliver more power, but also let the engine operate at high temperatures, to reduce emissions. The device should also respond rapidly to permit the engine temperature to be reduced, for example, within a time horizon of a real time loading event of an engine.

Therefore, according to a first aspect of the present invention there is provided, an apparatus for controlling a temperature of an engine by controlling a flow of a liquid engine coolant, the apparatus comprising:

a thermostat having a temperature responsive valve for substantially blocking and substantially unblocking the flow of said liquid coolant to a radiator, said thermostat having a first temperature activation range;

a thermally activated actuator operatively connected to said valve, said actuator having a second temperature activation range above said first temperature activation range; and a source of electrothermal energy for activating said actuator to cause said temperature responsive valve to unblock the flow of said liquid coolant on demand.

According to a further aspect of the invention there is provided a method of controlling a temperature of an engine having a coolant circulation system comprising the steps of:

a) providing a thermally activated actuator;

b) providing a thermostat having a fixed thrust surface and an openable valve including by a valve body;

c) operatively connecting said thermally activated actuator to said valve body of said thermostat;

d) monitoring said engine to determine when to open said valve; and e) opening said valve by activating said thermally activated actuator in response to said engine monitoring.

According to a further aspect of the invention there is provided an apparatus for controlling a temperature of an engine, said apparatus comprising:

a thermostat having a thermally controlled valve which opens to a first position in response to a coolant temperature, said first position corresponding to a first rate of coolant flow sufficient for maintaining an optimum engine temperature;

a thermally controlled actuator for opening said valve to a second position, said second position corresponding to a second rate of coolant flow sufficient to permit said engine to cool to a power delivering temperature below said optimum temperature; and a heater associated with said actuator, said heater being initiated when additional power is required.

BRIEF DESCRIPTION OF THE DRAWINGS

Reference will now be made to drawings which depict, by way of example only, preferred embodiments of the invention and in which:

FIG. 1 is a front cross-sectional view of the present invention in place in a coolant conduit with the valve closed;

FIG. 2 is a side cross-sectional view of the invention of FIG. 1;

FIG. 3 is a top cross-section along lines A—A of FIG. 2;

FIG. 8 is a front cross-sectional view of a further embodiment of the invention; and FIG. 9 is a side cross-sectional view of the further embodiment of FIG. 8.

DETAILED DESCRIPTION OF THE PREFERRED EMBODIMENTS

Figure 5:
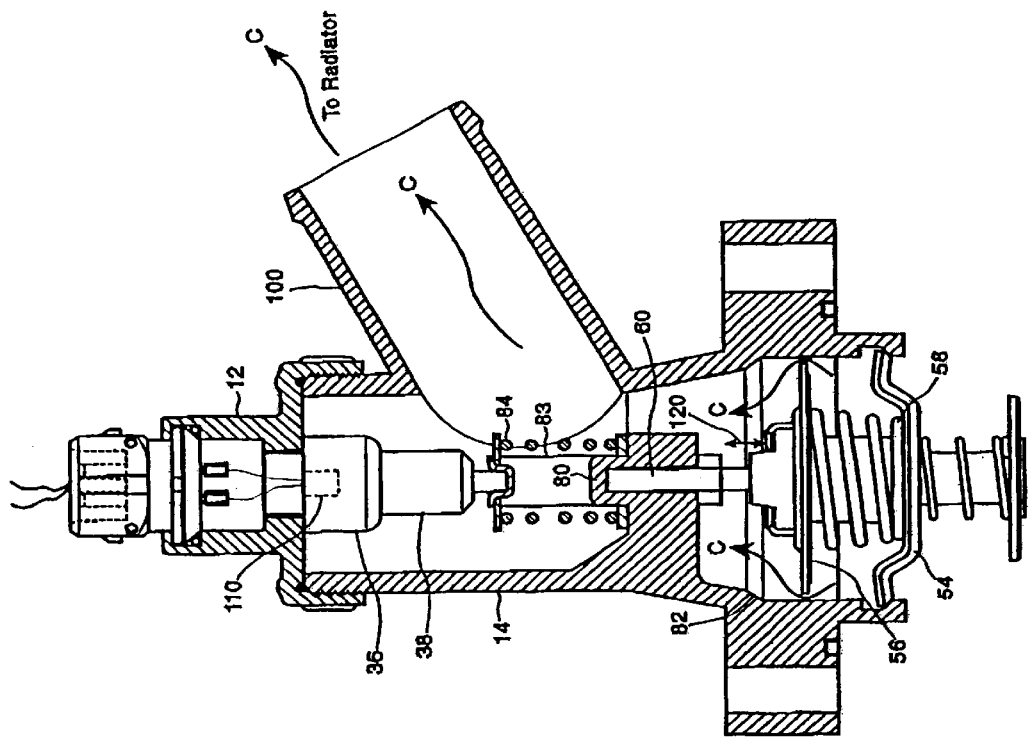
FIG. 5 is a side cross-sectional view of the invention of FIG. 4.

An apparatus for controlling a temperature of an engine by controlling a flow of liquid engine coolant as illustrated generally as 10 in FIG. 1. The apparatus includes an end cap 12, and a main body 14 which defines a fluid conduit 16. The main body 14 includes an attachment flange 18 having a pair of opposed fastener openings 20 for attaching the device 10 onto the cooling system of, for example, a vehicle. An O-ring 22 is provided to permit a liquid tight seal to be made between the part 10 and the remainder of the engine system. Although a particular configuration for end caps and main body is shown, it will be appreciated that various forms of fitting could be used without departing from the present invention.

Associated with the end cap 12 is an instrumentation package including a pair of electrical leads 24 which are connected to a fitting 26 external to the conduit 16. A retaining ring 28 is associated with the instrumentation package 26 which includes an O-ring 30 to provide a liquid tight seal with respect to liquid in the conduit 16. The retaining ring 28 is preferably formed with a sloped surface 32 for interfacing with the O-ring 30.

Electrical leads 24 are most preferably connected to an electrical circuit controlled, for example, by an Engine Control Module (ECM). Typically an ECM will include a plurality of sensors which are used to sense various engine and vehicle parameters so the performance of the engine can be optimized. The present invention comprehends either using existing sensors, if appropriate and available, or using added sensors to provide the ECM with sufficient information to take advantage of the present invention as described herein.

Extending below the retaining ring 28 is a body 34 of the device which includes a closed portion 36 which forms a reservoir for a thermally expandable material (not shown), an extension 38 and a piston 40. It will be noted that the reservoir 36, extension 38 and piston 40 extend into the conduit 16 and in normal full coolant conditions would be surrounded by coolant fluid. The reservoir 36, extension 38 and piston 40 may be considered to be an actuator, as explained below.

The top part 12 is secured to the main body 14 by being threaded for example, at 42. Again, an O-ring 44 may be used to provide a secure liquid tight connection, between the top part 12 and main body 14.

Also shown in FIG. 1 is a conventional thermostat 50 which includes a body 52 containing a thermally expandable material, a mounting bracket 54, a valve 56, a spring 58 extending between the mounting bracket 54 and the valve 56, and a piston 60. Also shown in FIG. 1 is a receptacle 80 into which piston 60 fits. The receptacle 80 is fixed in place and thus acts as a thrust surface for piston 60. Also shown is a chamfered valve seat 82 against which the valve 56 seals. An important characteristic of the valve seat 82 is that the opening is sized and shaped so that the further displaced the valve 56 is from the valve seat 82, the greater the flow of coolant to the heat exchanger, up to a maximum flow rate. The operation of these components is explained in more detail below.

Located in the middle of the conduit 16 is a connecting apparatus which includes a load transfer member 83 having a spring 84 extending between a ledge 86 shown in FIG. 1 and a ledge 88 shown in FIG. 2. The member 83 operatively connects the actuator with the thermostat 50. Again the operation of these elements will be described in more detail below.

Turning to FIG. 2, a cross-sectional view through the element 80 is now visible, showing that the element 80 extends outwardly from the side wall of the conduit 16 and thus permits the piston 60 of thermostat 50 to push there against as a thrust surface or point. Also shown is the support bracket 54 being lodged in downwardly dependent arms 90 fixed to main body 14 which locate the thermostat 50 in place. It is most preferred if the arms 90 are sized and shaped to fit into the coolant conduit located below main body 14 for ease of assembly. It will be noted that the conduit 16 includes a Y-connection 100 which will permit coolant to circulate to a radiator (not shown). Thus arrow 102 shows location of a radiator, and arrow 104 shows the inflow of coolant into conduit 16 from the engine (not shown). Arrow 105 shows the coolant not passing past valve 56, which in this FIG. 2 is closed.

FIG. 3 shows a cross-sectional view from above of the elements of FIG. 2 along section line A—A. In particular, the main body 14 is shown forming a conduit 16 having a receptacle 80 for the piston 60. Also shown is the load transfer member 83 extending on either side of the receptacle 80. The load transfer member 83 is sized and shaped to be guided by an outer surface of the receptacle 80. Other forms of load transfer member may be used, but reasonable results have been obtained with the form of member 83 as shown.

Returning to FIG. 2, also shown is an electrical heater 110 which extends downwardly into the closed portion 36 of body 34. The electrical heater 110 is attached by means of insulated leads 112 which in turn form part of the instrumentation package 26. It will be understood that other types of electrical connections can be made, provided that the ECM is operatively connected to the heater 110.

FIG. 2 shows the position of the valve 56 when the coolant and engine are cold. In this circumstance, the valve 56 is tightly placed against the valve seat 82 blocking the flow of coolant from the engine to the radiator. This permits the coolant to recirculate past the engine allowing the engine to achieve its desired operating temperature more quickly (shown at 105 in FIG. 2).

Figure 4:
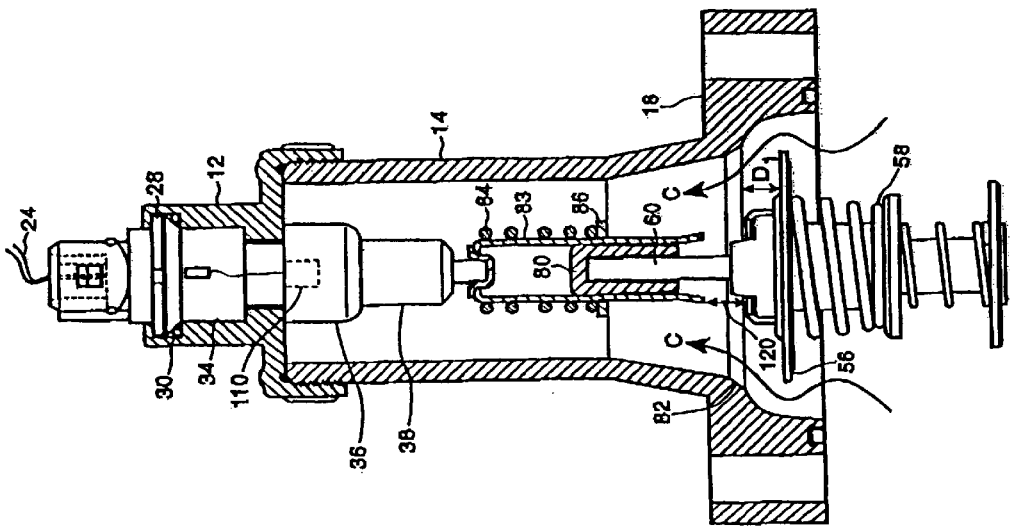
FIG. 4 is a front cross-sectional view of the present invention in place in a coolant conduit with the valve open in a first mode.

Turning now to FIGS. 3 and 4, it can be seen that the valve 56 has moved off the valve seat 82. At this time the temperature of the coolant has reached the activation temperature of the thermally expandable material in thermostat 50 causing it to expand and thereby causing the piston 60 to extend. Since the piston 60 abuts a thrust surface in the receptacle 80, the extension of the piston 60 from the body 52 forces the valve 56 downwardly away from the valve seat 82 compressing the spring 58. In this position the coolant can flow past the valve 56 and out into the radiator through the limb 100 of the conduit as shown by arrows C. It will be noted from FIG. 4 that although the valve 50 has opened, the load transferring member 83 has not moved and as a result a gap 120 exists between the load transfer member 83 and the valve 56. In the event coolant temperature drops below the thermal activation point for the thermostat 50, the spring 58 will cause the valve 56 to close onto the valve seat 82, thereby reducing heat dissipation and preserving the engine temperature at the optimum set point temperature.

According to the present invention, it is preferred if the temperature activation range of the thermostat 50 is above the normal range for mass produced vehicles. Thus, where typically a thermostat will be set to begin to respond at a temperature of between 90° C. and 95° C., in the present invention the preferred activation temperature is between about 100° C. to 105° C. Most preferably the temperature activation range will begin at about 102° C. and be complete at about 10° C. higher at about 112° C. This temperature range is referred to as a first activation range. When the temperature of the coolant reaches 112° C. for example, the valve 56 will be displaced from the valve seat a distance D1. D1 is defined as a distance which is enough to permit the engine to operate at the desired set point steady temperature. This amount of cooling can be achieved with coolant circulation flows of about 1 to 2 cubic meters per hour for a typical mid-sized car. Of course other types of cars or trucks will have different engine heat loads requiring different ranges of coolant flow. As explained in more detail below, the valve position for temperature maintenance at the optimum engine temperature is preferably not a fully open position of the valve 56. Rather, the valve position at D1 is such that enough coolant flow is allowed to achieve temperature maintenance. It will be further understood that an engine operating over a temperature range of 102° C. to 112° C. for a steady state temperature is running significantly hotter than a conventional system. This encourages more complete combustion, less emissions and a greater fuel economy. It is estimated that the fuel savings could be between one and two percent, or even higher depending upon the specifics of the engine.

Figure 7:
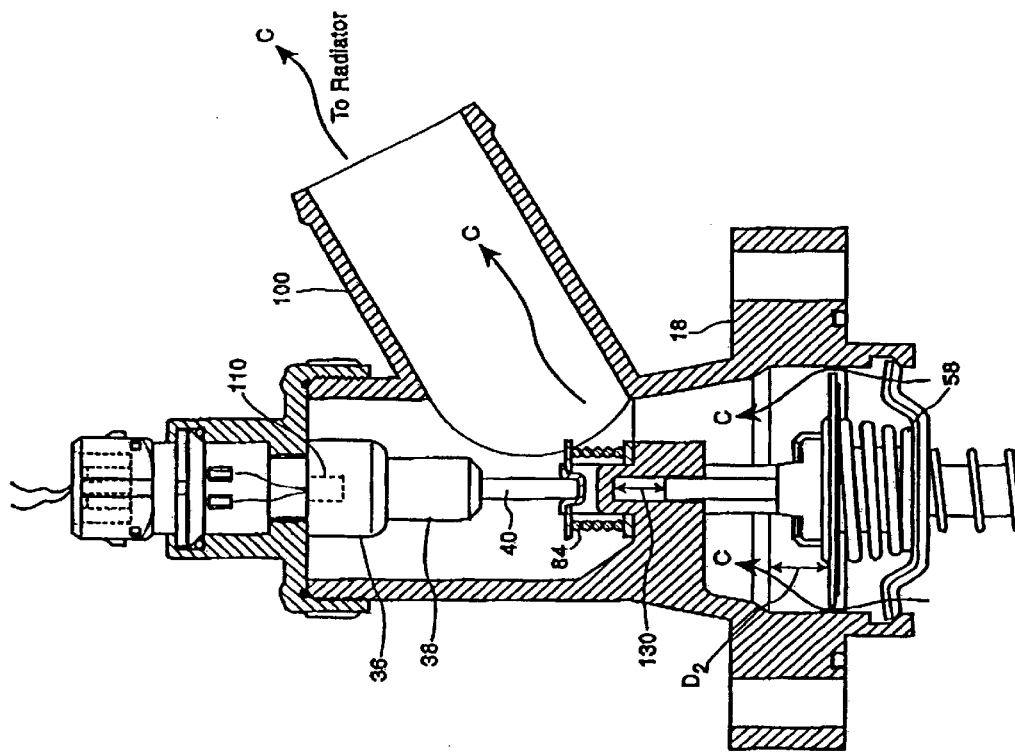
FIG. 7 is a side cross-sectional view of the invention of FIG. 6.
Figure 6:
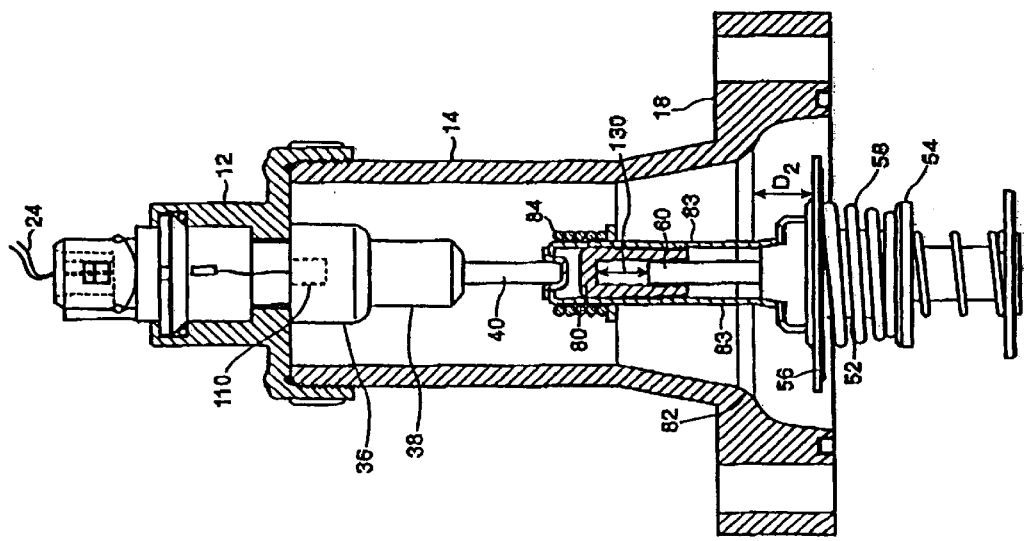
FIG. 6 is a front cross-sectional view of the present invention in place in a coolant conduit with the valve open in a second mode.

FIG. 6 shows the configuration of the present invention when the piston 40 is extended. Piston 40 will be extended upon the engine control module sending a signal to the heater 110 causing the heater to rapidly heat up and in turn cause the thermally expandable material in the actuator to expand. As noted previously, this will occur as a result of particular conditions existing in the engine load, such as an acceleration or other circumstance which creates a need for more power, and hence more cooling. Heat from the heater 110 has the effect of pushing the piston 40 outwardly causing it to push load transferring member 83 downwardly. The load transferring member 83 transfers the load from the piston 40 to the shoulders of the thermostat 50, causing the valve disk 56 to be displaced away from the valve seat 82. Again, this permits the coolant to circulate past the thermostat 50 shown as arrows C and to the radiator through the leg 100. As can be seen in FIGS. 6 and 7, the extension of the piston 40 compresses the spring 84. Further, the extension of the piston 40 causes the piston 60 to move within the receptacle 80 creating a gap shown at 130. Again, the valve 56 is displaced of the valve seat 82 but this time by a distance D2. According to the present invention D2 is a distance sufficient to permit much greater flow of coolant past the valve than occurs at D1 and is enough coolant flow to permit the engine temperature to be lowered, rather than held at a steady state, which is accomplished at position D1. Further, the lowering of the temperature is preferred to occur rapidly, within a time horizon of a loading event meaning that the coolant flow should be sufficient to achieve rapid cooling of the engine, if possible. Most preferable D2 permits a coolant flow rate of about 8 to 12 cubic meters of flow per hour for a conventional mid sized car. As will be appreciated by those skilled in the art, other car types and other engine sizes may require more or less coolant flow. Thus D2 will represent a further open position than D1. One method to achieve this according to the present invention is to cause the piston 40 to extend more or further when activated than the piston 60 extends when it is activated. However, other methods may also be used to achieve the same result of providing a greater cooling capacity by means of the actuator than the thermostat 50.

Also according to the present invention the thermally expansible material responsible for extending piston 40 will be set to a different or second temperature activation range from the first temperature activation range responsible for extending piston 60. Most preferably, the second temperature activation range will be significantly higher than the first temperature activation range of the main thermostat and may be, for example, about 25° C. higher. For example, thermally expansible material in the actuator responsible for extending piston 40 could be set to respond to about temperatures of 125° C. to 127° C. Since this second range is well above the first range, the piston 40 will never be caused to extend by reason of the coolant temperature alone. Quite simply, the operative range of the thermally expansive material in the actuator is above the actuation temperature range of the thermostat 50. Thus, by normal operation the thermostat 50 will prevent the coolant from ever being able to get as high as the actuator initiation temperature. In this manner, the actuator is only activated as a result of electrical output from the electrical heater contained within the closed body 56 or by a direct command from the ECM.

It has been found that a rapid extension of the piston 40 can be achieved by choosing a heating element for heater 110 which heats to a temperature significantly higher still, for example to about 150° C. Also, it is preferred if the response is fast. This will permit the temperature of the thermally expansible material to reach expansion temperature much more rapidly. Of course, the temperature cannot be so high that it damages any of the components, especially the thermally expansible material. Thus, according to the present invention, a signal to heat the heater will quickly raise the temperature to cause the piston 40 to extend. A response time of under 10 seconds is preferred, and about 6 seconds has been achieved to date, but even better performance may be possible.

As will also be appreciated, as well as rapid heating of the thermally expansible material, rapid cooling of the engine is required if the needed power boost is to be delivered within the event time horizon. To this end the valve 56 must be able to be opened more, under the increased power situation, than in a steady state condition, to permit greater coolant flow.

Thus, another aspect of the present invention is that the movement range of the valve 56 from the thermostat 50 corresponds to flow rates of 1 to 2 m$^3$ per hour. However, because of the size and shape of the valve opening between valve 56 and valve seat 82, the piston 40 opens the valve 56 more corresponding to a flow rate of about 10 m$^3$ per hour. In this way rapid cooling is provided, enough to lower the temperature of the coolant to well below normal operating temperatures, such as for example to about 70° C. to 80° C. Such a low engine temperature will increase power.

According to the present invention, the body 36 is located on the cold side of the valve 56. The body 56 is completely surrounded by coolant which means that the temperature of the body 56 will be kept within the relatively small dynamic range of coolant temperatures. This means that the electrical energy required to heat the thermally expansible material in the body 36 will be restricted to a fairly narrow range thus permitting a more accurate and timely extension of the piston 40. In other words, by providing the body 36 in the coolant, the coolant acts as a temperature buffer which in turn ensures that the piston 40 is more reliably and more quickly extendable by the electrical heater 110.

For example, the body 38 will already be at the coolant temperature, because it is immersed therein. Thus, for steady state operation, the thermally expansible material will be essentially preheated to the running temperature of between 102° C. to 112° C. for example. In this way, there is a smaller thermal gap to overcome allowing more prompt heating, and extension of piston 40. The initiation temperature of the material in body 38 can be any temperature, but is preferably a higher temperature and most preferably is a temperature which is higher enough to prevent unwanted extension of the piston by ambient conditions.

A further aspect of the present invention is that since it is surrounded by coolant, once the engine control module stops sending electrical energy to the heater, the coolant will have the effect of quickly cooling down the body 36. The then occurring difference in coolant temperature and the temperature of the actuator will be large leading to more rapid cooling. Specifically, the actuator through piston 40 opens the valve 56 and permits the rapid cooling of the engine due to higher flow rates. This will lower the temperature of the engine and coolant to a lower temperature (which delivers a correspondingly higher power). Again, by way of example only, for a mid sized conventional car a preferred power delivering temperature is between 70 and 80 degrees C. and most preferably about 75 degrees C. Thus shortly after the heater in the actuator is initiated, the engine coolant temperature will also be about 75 degrees. Since the heater heats up to about 150 degrees as previously stated, the temperature difference is large between the thermally expansive material and the coolant (about 75 compared to between 140 and 150) and thus the thermally expansible material of the actuator is rapidly cooled by reason of the large temperature difference.

Quick cooling causes the piston 40 to retract relatively rapidly as well. This will permit the piston 60 to engage the receptacle 80 at the appropriate degree of openness for the valve 56 for that coolant temperature. In the example of a temperature of 75 degrees the valve 56 of thermostat 50 may be for example fully closed if the power delivering lower temperature occurred over a long enough period to permit the piston 60 to fully retract from its steady state position.

It will also be appreciated that the load transferring member 80 extends between the top piston 40 and the body of the thermostat 50. Thus, as the top piston 40 extends the valve 56 is opened by movement of the body of the thermostat 50. As the coolant temperature reduces as a result of the actuator opening the valve 56, the thermostat 50 will react in a normal manner retracting the piston 60. However, because the piston 60 is spaced from the thrust seat 80 by the load transfer member 83, the position of the piston 60 will not influence the position of the valve 56 relative to the valve seat 82. In this manner, the effect of the electronically controlled actuator valve opening is not cumulative, nor subtractive, of the effect of the coolant temperature thermostat valve opening. Rather the two effects are separate and independent. Thus, the temperature of the coolant can be set according to engine load since the valve can be opened immediately and by an appropriate signal from the ECM on demand.

It can now be appreciated that the valve 56 can be made to open enough to cause temperatures of coolant which are lower than the range of the normal operating temperatures set by a conventional thermostat. In circumstances where more power is required, it may be desirable to lower the temperature to a power delivering temperature. This can be accomplished simply by the engine control module energizing the electric heater in the actuator. In this case the valve can be opened to permit the temperature to be lowered and a burst of power to be delivered. Alternately, it is also known that a higher set point temperature permits the engine to operate with reduced emissions, at better fuel economy but with reduced power. This compromise has resulted in lower operating temperatures than might otherwise be desirable to reduce emissions. The actuator of the present invention permits engine operation at a higher running temperature for the purpose of reducing emissions, because any power loss can be compensated for on demand as explained above.

FIGS. 8 and 9 show a further embodiment of the present invention, including a separate, but contiguous external heater, identified as 200. In the embodiment of FIG. 8, like components to those in the embodiment of FIG. 1, are shown with the same reference numeral. In this embodiment, rather than placing the heater inside of the thermostat as shown at 110 in FIG. 1, the heater 200 is placed or attached to an outside, or externally of the thermal actuator 36. Most preferably, the heater 200 is in the form of a disc shaped body, having a height 202 sufficient to house resistance heating elements, and a diameter 204 which matches the diameter of the actuator 36. Adequate results have been achieved through the use of a surface to surface mechanical connection, such as welding or glue, but other types of connection are also comprehended. What is desired, is to promote heat transfer between the heater 200 and the actuator 36 so good surface to surface contact is preferred.

It will now be appreciated that the heater 200 has certain advantages. Firstly, it does not require a specialized thermostat which includes a built-in heater 110 as with the previous embodiment. Such a built-in heater 110 requires an electrical connection between the power source (outside of the thermostat) and the heater 110 (inside of the thermostat). Thus, an electrical path must be provided through the walls of the thermostat which is expensive and can lead to a loss of integrity of the thermostat envelope should there be a failure. In contrast, the self contained heater 200 can be easily and simply attached to an existing conventional self-contained thermostat with no loss of integrity of the thermostat envelope.

Although shown as being coextensive with the end surface of the actuator 36, the present invention comprehends other configurations of contact heaters for the actuator. For example, the heater could be made smaller in size that the end face of the actuator 36 that the heater 200 is in contact with, but this would affect heat transfer rate. Thus to optimize efficiency it is preferred to use a larger contact area than a smaller contact area, although as will be understood by those skilled in the art that the heat transfer is a function of a number of variables in addition to the contact area between the heater and the thermostat including, temperature differential, heat transfer medium, time horizon within which heat transfer must occur, and the responsiveness of the thermally expansive material. Depending upon what results are desired, the contact area can be varied within limits. The present invention therefore also comprehends that the heater could be made to extend around the sides of the thermostat, but this would increase the diameter of the thermostat which may not be desirable in some circumstances. Essentially, the present invention comprehends all forms of contact heater that have the sufficient surface to match enough of the outside surface of the thermostat to provide sufficient heat transfer to cause enough displacement during the desired event time horizon.

Also shown is an insulator 206, which can be used to improve the efficiency of heat transfer. In this case, the heat from the heater 200 is prevented from escaping upwardly, thus the power source 210 is protected from the heat. As well, the heat is directed back into the heater body, meaning that more heat is transferred into the thermostat 36. Various materials can be used to insulate the heater 200, such as will be known to those skilled in the art. The insulator 206 also has the effect of shielding the heater 200 from ambient conditions as well.

In the preferred form of FIGS. 8 and 9, the heater thermally actuated actuator 36 is shown partially immersed in the liquid coolant. Also it will be noted that the heater 200 is in contact with that portion of the actuator which is clear of the coolant. In this way, the heat generated by the heater 200 is directed into the actuator 36. While the present invention comprehends that the actuator 36 may be fully immersed in the liquid coolant, in such a case the heater would need to be insulated from the coolant so as to permit the heat to be directed into the actuator, rather than the liquid coolant.

As will be understood by those skilled in the art, the body of the thermostat is typically formed from a material having a high heat transfer coefficient, such as a metal. This permits the surrounding fluid temperature to be communicated to the thermally expansive material contained within the thermostat 36. For the externally mounted heater 200 such a heat transfer material is also preferred for the body, to permit the heater 200 to more easily heat the thermally expansive material. However, the present invention comprehends forming the thermostat from non-heat conducting material for other than the surface contact area of the heater 200.

It will be further understood that the embodiment of FIG. 8 operates in the same manner as the previous embodiments, except that the heater is externally mounted, most preferably in contact with the thermostat, and preferably insulated rather than being internally mounted. Thus, if the thermostat has a first temperature activation range, which may for example be a start to open the temperature of 102° C.±2° C. and a fully open temperature of 112° C.±2° C., then the thermal activated actuator might have an initial activation temperature of about 10° C. higher than the full open temperature of the first activation range, namely the second activation temperature would be about 122° C.±2° C. To achieve rapid deployment of the piston, a narrow temperature range is preferred, such as a further 10° C. to 132° C.±2° C. for the fully open temperature. However, provided that there is sufficient power in the electrical heater for rapid heating, the temperature which results in a fully extended piston can vary somewhat.

It will be appreciated by those skilled in the art that the foregoing description relates to preferred embodiments of the invention by way of example only. Various modifications and alterations of the invention have been suggested above and others will be apparent to those skilled in the art which still fall within the scope of the appended claims. For example, although the difference in initiation temperature between the upper and lower portions is preferred to be about 25°, any range of temperatures can be used provided that the actuator initiates at a temperature higher than the thermostat so that the actuator does not open the valve in an unintended fashion.

We claim:

1. An apparatus for controlling a temperature for an engine by controlling a flow of a liquid engine coolant, the apparatus comprising:

a thermostat having a temperature responsive valve for substantially blocking and substantially unblocking the flow of said liquid coolant to a radiator, said temperature responsive valve responding to a temperature of said liquid coolant;

a thermally activated actuator operatively connected to said valve, the actuator being positioned so as to be at least partly immersed in said coolant when in use, so as to have an actuator temperature which approaches a coolant temperature when the actuator is not being thermally activated; and a heater in external contact with said thermally activated actuator to provide thermal activation to actuate said actuator to unblock the flow of coolant on demand.

2. An apparatus for controlling a temperature of an engine as claimed in claim 1 wherein said thermally activated actuator includes a thermally expansive material.

3. An apparatus for controlling a temperature of an engine as claimed in claim 2 wherein said actuator is partially immersed in said liquid coolant, and said heater is in external contact with a portion of said actuator which is clear of said liquid coolant.

4. An apparatus for controlling a temperature of an engine as claimed in claim 1 wherein the thermally activated actuator includes a first extendible piston, said piston causing said valve to open upon being extended.

5. An apparatus for controlling a temperature of an engine as claimed in claim 4 wherein said thermostat includes second extendible piston and said first extendible piston of said actuator acts on a body of said thermostat.

6. An apparatus for controlling a temperature of an engine as claimed in claim 5 wherein said second extendible piston is seated on a fixed element at one end and extension of said second extendible piston causes said valve to move relative to said fixed element.

7. An apparatus for controlling a temperature of an engine as claimed in claim 1 wherein thermally activated actuator includes a spring to return said actuator to a rest position.

8. An apparatus for controlling a temperature of an engine as claimed in claim 7 wherein said rest position is a retracted position.

9. An apparatus for controlling a temperature of an engine by controlling a flow of a liquid engine coolant, the apparatus comprising:

a thermostat having a temperature responsive valve for substantially blocking and substantially unblocking the flow of said liquid coolant to a radiator, said temperature responsive valve responding to a temperature of said liquid coolant;

a thermally activated actuator operatively connected to said valve, the actuator being positioned so as to be at east partly immersed in said coolant when in use, so as to have an actuator temperature which approaches a coolant temperature when the actuator is not being thermally activated; and a heater in external contact with said thermally activated actuator to provide thermal activation to actuate said actuator to unblock the flow of coolant on demand;

wherein said thermostat has a first temperature activation range and said actuator has a second temperature activation range above said first temperature activation range.

10. An apparatus for controlling a temperature of an engine as claimed in claim 9 wherein first temperature activation range is about 102° C. to 112° C.

11. An apparatus for controlling a temperature of an engine as claimed in claim 9 wherein said second temperature activation range is above a high end of said first activation temperature range.

12. An apparatus for controlling a temperature of an engine as claimed in claim 9 wherein second temperature activation range begins at a temperature about 10° higher than a high end of said first temperature activation range.

13. An apparatus for controlling a temperature of an engine as claimed in claim 2 wherein an engine control module includes one or more sensors for monitoring engine performance and wherein said electronic control module determines a desired engine temperature based on one or more outputs from said sensors, and initiates said actuator to achieve the desired engine temperature.

14. An apparatus for controlling a temperature of an engine as claimed in claim 13 wherein said engine control module includes sensors to sense one or more of coolant temperature, acceleration, RPM, torque, and engine load.

15. An apparatus for controlling a temperature of an engine, said apparatus comprising:

a thermostat having a thermally controlled valve which opens to a first position in response to a coolant temperature, said first position corresponding to a first rate of coolant flow sufficient for maintaining an optimum engine temperature;

a thermally controlled actuator for opening said valve to a second position, said second position corresponding to a second rate of coolant flow sufficient to permit said engine to cool to a power delivering temperature below said optimum temperature; and an external contact heater associated with said actuator, said external contact heater being initiated on demand.

16. An apparatus for controlling a temperature of an engine as claimed in claim 15 wherein said optimum temperature is between about 102 and 112 degrees C.

17. An apparatus for controlling a temperature of an engine as claimed in claim 16 wherein said power delivering temperature is between about 70 degrees C. and about 80 degrees C.

18. An apparatus for controlling a temperature of an engine as claimed in claim 15 wherein said first rate of coolant flow is between about 1 and 2 cubic meters per hour.

19. An apparatus for controlling a temperature of an engine as claimed in claim 15 wherein said second rate of coolant flow is about 10 cubic meters per hour.

* * * * *